United States Patent [19]

Ozeki

[11] Patent Number: 4,814,924

[45] Date of Patent: Mar. 21, 1989

[54] COMPOSITE MEMORY DEVICE

[75] Inventor: Tomotaka Ozeki, Takatsuki, Japan

[73] Assignee: Hitachi Maxell, Ltd., Osaka, Japan

[21] Appl. No.: 109,161

[22] Filed: Oct. 16, 1987

[30] Foreign Application Priority Data

Sep. 9, 1987 [JP] Japan ................................ 62-225988
Oct. 16, 1986 [JP] Japan ................................ 61-244060

[51] Int. Cl.⁴ .................... G11B 5/012; G11B 7/00; G11B 23/03; G11C 13/06
[52] U.S. Cl. .................................. 360/133; 369/272; 369/273; 369/291; 365/122
[58] Field of Search ................ 360/133, 132; 369/291, 369/272, 273

[56] References Cited

U.S. PATENT DOCUMENTS

| | | | |
|---|---|---|---|
| 3,978,320 | 8/1976 | McBride | 365/119 |
| 4,581,716 | 4/1986 | Kamiya | 365/226 |
| 4,602,351 | 7/1986 | Shimamura et al. | 365/52 |
| 4,683,371 | 7/1987 | Drexler | 365/106 |

Primary Examiner—Robert S. Tupper
Attorney, Agent, or Firm—Antonelli, Terry & Wands

[57] ABSTRACT

Disclosed is a composite memory device which comprises a recording disc medium having a large number of recording tracks to and from which data is written and read, a housing for holding the recording disc medium, a rewritable semiconductor memory disposed within a portion of the housing, and pins disposed within a portion of the housing for transferring data between the semiconductor memory and an external device.

4 Claims, 6 Drawing Sheets

COMPOSITE MEMORY DEVICE

BACKGROUND OF THE INVENTION

1. Field of the Invention

The present invention relates to a composite memory device which, by including two kinds of memory, enables a reduction in access time. One kind of memory is a magnetic or optical disk which require a relatively long access time to read data recorded on a recording track of the disk or to write data on a recording track thereon, the other is semiconductor memory adapted to contain data for use in accessing files on the disk.

2. Description of the Prior Art

Figure 1:
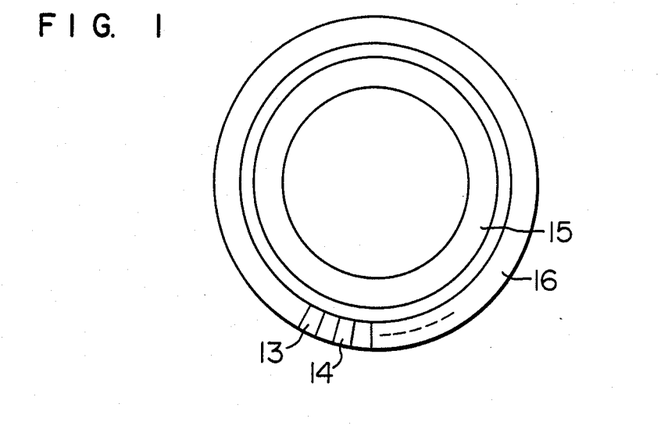
FIG. 1 is a schematic view of a conventional magnetic disk medium, explaining the formatting thereof.
Figure 2:
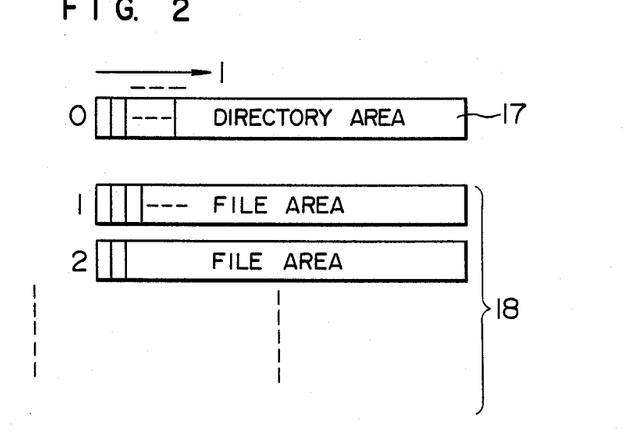
FIG. 2 illrustrates the relationship between tracks and sectors shown in FIG. 1.

Magnetic or optical disks are formatted to enable data to be recorded thereon. FIG. 1 shows one example of the format of a magnetic recording medium or disk. The disk has several tracks 15, 16, each of which being divided into several sectors 13, 14. The tracks 15, 16 and the sectors 13, 14 are allocated track addresses and sector addresses, respectively, and are adapted to contain data. FIG. 2 shows one example of the relationship between tracks and sectors. The tracks are called track 0 (17), track 1 (18), track 2 (18) . . . in order from the outer periphery of the magnetic recording disk, track 0 (17) defining a directory area used to locate file data recorded on the magnetic recording disk, track 1 (18), track 2 (18) . . . after track 0 defining file areas. When data in a certain file area is to be read, a head of an external unit such as a disk drive unit (hereinafter referred to as a disk drive) is first moved to the directory area to read the track and sector addresses corresponding to the track of the data which is to be read, then the head is shifted to the corresponding file area to read the data. In the above-described arrangement, the time required for the disk drive to access the data is relatively long on average, up to about 100 milliseconds.

SUMMARY OF THE INVENTION

Accordingly, one object of the present invention is to provide a composite memory device capable of overcoming the above-mentioned disadvantage of the conventional arrangement of disks, that is, a composite memory device which has a very short access time even when the disk has a large memory capacity.

In order to attain the above-mentioned object of the present invention, a rewritable non-volatile semiconductor memory is incorporated in a memory device which includes a recording disk medium, for storing therein directory data. Such semiconductor memories normally have access times of about 10 to several hundreds of nanoseconds, which are much shorter than those of conventional memory devices using magnetic or optical disks in which seek times include the time required for mechanically shifting the head and the time required for searching for the data or recording area.

In consequence, the access speed of the composite memory device of the present invention is increased, even if the memory device has a large recording capacity, since at least the contents of the directory are stored in a semiconductor memory which has a relatively short access time, to enable location of the data file areas.

To this end, the present invention provides a composite memory device comprising a recording disk medium having several recording tracks to and from which data is written and read, a housing for holding the recording disk medium, a rewritable semiconductor memory disposed within a portion of the housing, and pins disposed within a portion of the housing and adapted to transfer data between the semiconductor memory and an external unit.

According to one of the aspects of the present invention, a slidable shutter is provided on the housing of the composite memory device so as to cover the pins of the semiconductor memory as well as a head entry aperture formed in the housing.

BRIEF DESCRIPTION OF THE DRAWINGS

The present invention will be described hereinbelow by way of example which does not specifically limit the scope of the present invention, with reference to accompanying drawings in which.

DETAILED DESCRIPTION OF THE PREFERRED EMBODIMENTS

Figure 3:
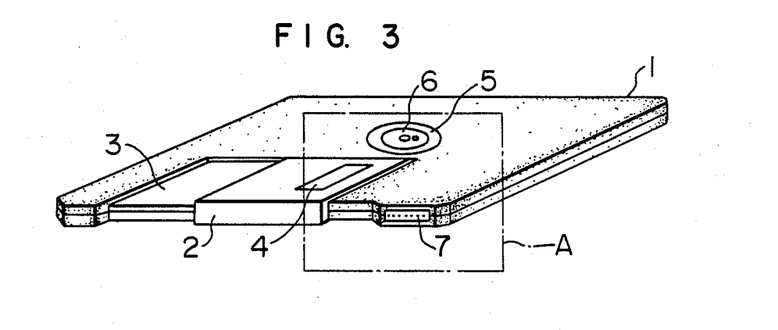
FIG. 3 is a perspective view of a composite memory device, showing a first embodiment of the present invention.

FIG. 3 is a perspective view of a first embodiment of a composite memory device according to the present invention. The composite memory device includes a housing 1, a shutter 2, recesses 3, head entry aperture holes 4, a hub aperture 5, a hub 6 and pins 7.

Shown in the figure is what is called a 3.5-inch microfloppy disk cartridge which contains as a discshaped recording medium a magnetic disc. The magnetic disc (not shown) is encased in the housing 1. A central portion of the housing 1 is provided with the aperture 5 through which the hub 6 fixed to the center of the disc is exposed. The disc is rotated through the hub 6 when the disc cartridge is loaded into a disc drive.

Each side of one edge of the housing 1 is provided with the recess 3. The shutter 2 is mounted on the recesses 3 in such a manner that it can be slid within the recesses 3 so as to open and close head entry apertures provided at the recesses 3. A portion of the shutter 2 is provided with the head entry aperture hole 4 which is substantially aligned with the head entry aperture when the shutter opens the head entry aperture.

The pins 7 are provided on a portion of the outer periphery of the housing 1 for connecting an incorporated semiconductor memory to be described later to an external device (hereinafter referred to as a disc drive) so as to transfer signals therebetween.

The composite memory device in this embodiment has an external view described above.

Figure 4:
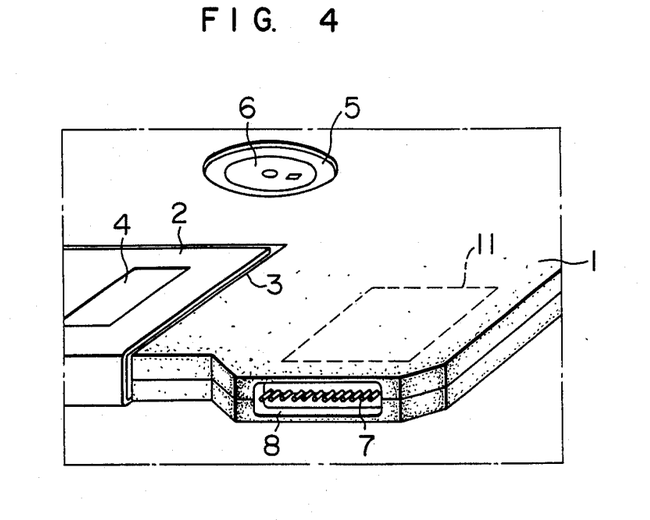
FIG. 4 is an enlarged view of a portion of the composite memory device of FIG. 3 which is surrounded by a dot-dashed line.

FIG. 4 is an enlarged perspective view of a portion of the device of FIG. 3 which is surrounded by a dot-dashed line, in which like reference numerals are used to designate like or corresponding parts in FIGS. 3 and 4. A reference numeral 8 denotes a pin opening, and 11 indicates a semiconductor housing portion.

In the figure, a semiconductor memory of the present invention is contained within the semiconductor housing portion 11 which is located in a portion of the housing 1 for the disc cartridge. Signal wirings which are drawn out from the semiconductor memory are connected to the pins 7 provided in the pin opening 8 formed in a portion of the outer periphery of the housing 1.

The pins 7 are connected to the connector provided on the disc drive when the disc cartridge is loaded into the disc drive. The pins 7 may be positioned on a location other than that shown in the figure.

Figure 5:
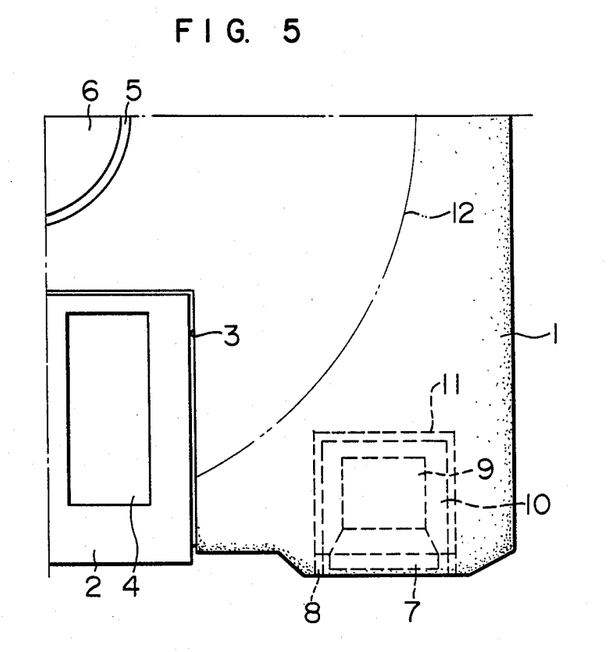
FIG. 5 is an enlarged plan view of the portion of FIG. 4.

FIG. 5 is a plan view of a portion indicated by A in FIG. 3 which is surrounded by the dot-dashed line, in which the same reference numerals are used to designate the parts which correspond to those in FIGS. 3 and 4. A reference numeral 9 denotes a rewritable non-volatile semiconductor memory; 10 denotes a wiring substrate; and 12 indicates a disc.

In the figure, the housing 1 of the disc cartridge contains the disc 12 indicated by the dot-dot-dashed line. The semiconductor memory of this invention includes the wiring substrate 10, the semiconductor memory chip 9 carried on the wiring substrate 10, and a backup battery (not shown) if necessary. It is disposed within the semiconductor housing portion 11 of the housing 1 in such a manner that the pins 7 formed on the substrate 10 are located in the pin opening 8.

The semiconductor housing 11 is positioned at a location at which it does not interfere with the disc 12 housed within the housing 1. However, it may be disposed at any position other than that shown in FIG. 5, so long as the semiconductor memory can be connected to the connector provided on the disc drive when the disc cartridge is loaded into the disc drive.

When the thus-arranged composite memory device is loaded into a disc drive which is designed to suit it, the disc drive accesses the directory stored in the semiconductor memory in response to, for example, the data read instruction from a host computer, and moves a head to a track which is recognized by the access so as to access the data stored in the corresponding sector.

Therefore, an access time required for a track and a sector accesses can be greatly reduced when compared with that of the conventional disc in which the directory area in one of the tracks is accessed. In consequence, the access time of the disc memory becomes substantially equal to the time required to access the track of the file area, reducing the overall access time greatly.

In this embodiment, the present invention has been applied to the 3.5-inch micro-floppy disc cartridge. However, the present invention is not limited to it, and 5.25-inch mini floppy disc or 8-inch floppy disc may also be used, if the semiconductor memory is of a very thin type and if its pins are of touch type, like an IC card.

A second embodiment of the present invention in which the present invention is applied to an optical disc cartridge will be described below.

Figure 6:
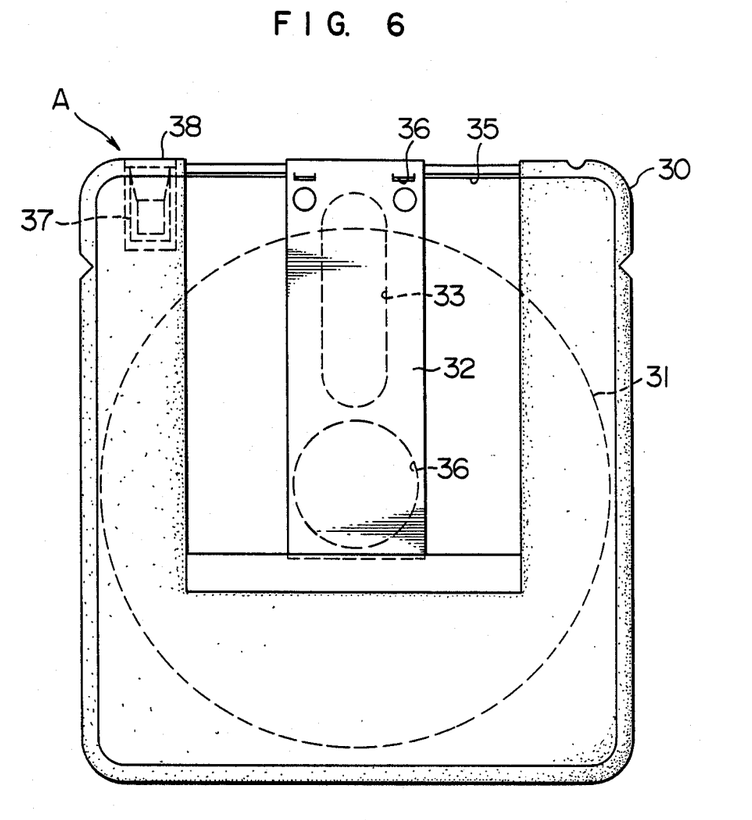
FIGS. 6 and 7 are plan and side views, respectively, of a composite memory device which contains an optical recording disk, showing a second embodiment of the present invention.
Figure 7:
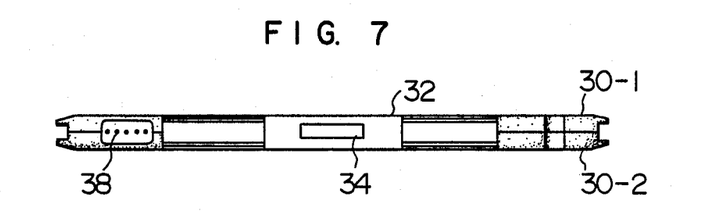

FIG. 6 is a plan view of the optical disc cartridge, and FIG. 7 is a side elevational view thereof. The disc cartridge is basially constructed by a cartridge casing 30 made of a synthetic resin, a disc-shaped recording medium 31 rotatably housed in the cartridge casing 30, and a shutter 32 formed by bending a metal thin plate into an inverted-shape.

The cartridge casing 30 is composed of an upper casing 30-1 and a lower casing 30-2 which are joined together by a plurality of threads so as to provide space used to accommodate the recording medium 31 and other components. The surface of the cartridge 30 is provided with a head entry aperture 33 through which the head is accessed to the housed recording medium 31. The head entry aperture 33 is normally closed by the shutter 32 so as to protect the recording medium.

The shutter 32 is formed by bending a metal thin plate such as a stainless plate into an inverted shape. The front of the shutter 32 is provided with a hole 34 which engages with a mover (not shown) for opening and closing the shutter so as to open and close the shutter. The shutter 32 also has inward projections 36 which engage with a guide groove 35 for guiding the shutter in the transverse direction as viewed in the figures. The shutter 32 is normally (while the disc cartridge is not in use) held at a position by a spring member (not shown) at which it closes the head entry aperture 33 and a spindle hole 36 into which a spindle of the disc drive is fitted, as shown in FIG. 6.

The disc-shaped recording medium 31 comprises an optical disc on two sides of which optical information is recorded. Normally, it is non-rotatably housed within the casing. It becomes rotatable by a mechanism (not shown) when the cartridge is loaded into the disc drive and the shutter opens the aperture.

The thus-arranged optical disc cartridge which has been described schematically in the above has been disclosed in Japanese Patent Laid-Open No. 150963/1983 by the present applicant, and its further description thereof is therefore omitted.

The optical disc cartridge incorporates, according to the present invention, a rewritable non-volatile semiconductor memory which stores directory data used to access the data stored in the optical disc. As shown in FIGS. 6 and 7, a semiconductor memory 37 is housed within the cartridge casing 30 of the optical disc cartridge at a position at which it does not interfere with the optical disc 31 and other components. The semiconductor memory 37 has pins 38 which are connected to a connector provided on the disc drive when the optical disc cartridge is loaded into the disc drive.

Figure 8:
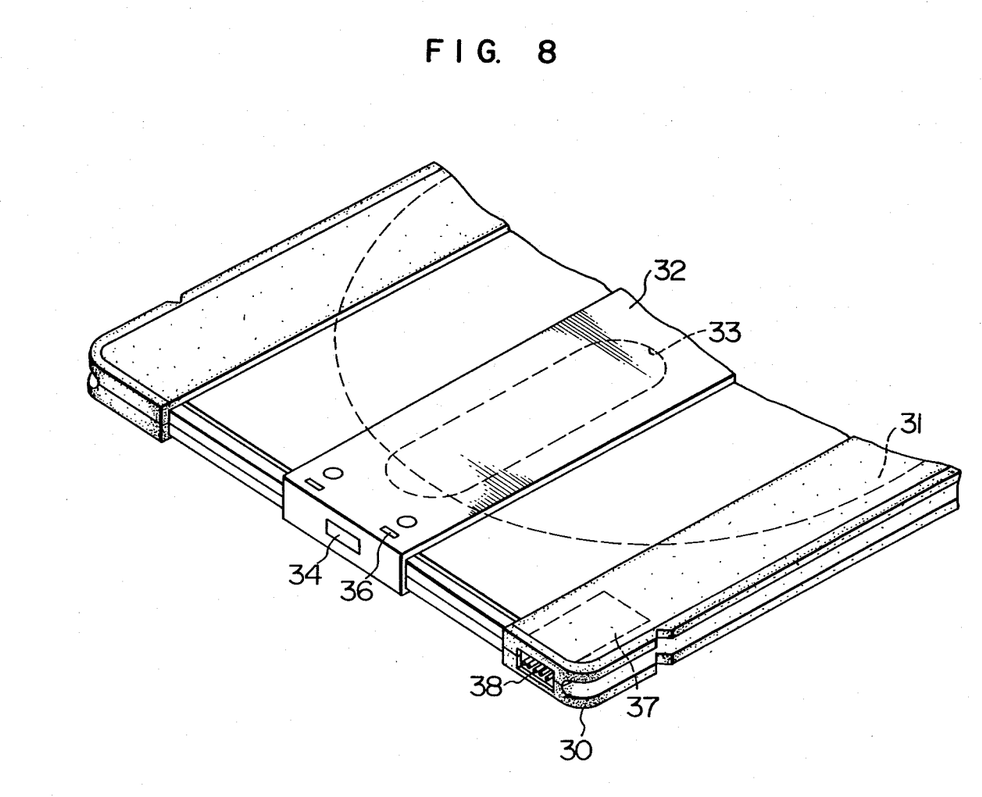
FIG. 8 is an enlarged perspective view of a portion of the composite memory device of FIGS. 6 and 7.

FIG. 8 is a perspective view of the optical disc cartridge of FIG. 6 when looking in the direction indicated by an arrow A, in which like reference numerals are used to denote the like parts in FIGS. 6 and 7.

In the figure, the pins 38 are positioned on a portion of the optical disc cartridge which constitutes a front thereof when the cartridge is loaded into the disc drive, and at a location at which it does not interfere with the movement of the shutter. The data stored in the semiconductor memory 37 is transferred to the host computer through the pins 38 and the connector provided on the disc drive, and the data from the host computer is transferred to the incorporated semiconductor memory therethrough, if necessary.

The semiconductor memory 37 stores the directory data which includes data to be used to access the data in the file areas of the optical disc and data to be used to identify an unused track, as does the semiconductor memory in the previous embodiment.

Thus, the access time of the optical disc is reduced to and becomes equal to that of the file areas, reducing the overall access time greatly when compared with the conventional optical disc.

In this embodiment, the rewritable semiconductor memory is incorporated in the optical disc cartridge. However, if an optical disc employed is a read-only disc, a read-only type semiconductor memory may be used accordingly.

Commercially available semiconductor devices each of which is composed of an IC memory chip and an CPU may be used as a semiconductor memory of this invention together with a back-up battery if necessary.

Next, a third embodiment of the present invention will be described below with reference to FIGS. 9 and 10.

So far as the previously described embodiments are concerned, the pins through which data are transferred between the semiconductor memory and the external unit or the disc drive, are exposed to the outside without protection.

Therefore, in a composite memory device arranged in any of the above-described manners, it often happens that the pins come into contact with the human body. This causes a serious problem particularly in a dry winter season when static electricity tends to be charged in the human body, because the charged static electricity may change or destroy the data stored in the semiconductor memory.

The third embodiment of the present invention has been devised so as to overcome the above-described problem.

In this embodiment, for the purpose of preventing the damage caused by the static electricity, a composite memory device has a mechanism which exposes semiconductor memory pins so that they can be connected to the connector provided on the disc drive when the composite memory device is loaded into the disc drive, and which screens them by a protection plate so that they cannot be touched by human body when the composite memory device is removed from the disc drive. When such a mechanism is provided on the composite memory device, the disc drive naturally must be provided with a mechanism which removes the protection plate and exposes the semiconductor memory pins which have been covered by the plate. This, however, increases the production costs of the disc drive and the composite memory device. Generally, the recording medium of a composite memory device is housed in a disc-shaped recording medium casing in order to prevent it from being damaged by the contact with the human body, and is exposed only through a head entry aperture opened in a portion of the casing and provided with a shutter. The shutter exposes the recording medium through the head entry aperture when the composite memory device is loaded into the disc drive, and covers the head entry aperture when the memory device is removed from the disc drive by being slid to a position at which it screens the recording medium. The function of the mechanism of the shutter satisfies the requirement of the protection plate mechanism which pretects the semiconductor memory from damages by the static electricity. In other words, the semiconductor memory pins are disposed in the housing at a position at which they are screened by the shutter when the shutter covers the head entry aperture and at which they are exposed when the shutter opens the head entry aperture. In this way, the pins for the semi-conductor memory can be prevented from making contact with human body, like the disc-shaped recording medium, and the handling of the composite memory device can be improved without increasing the production cost.

Figure 9:
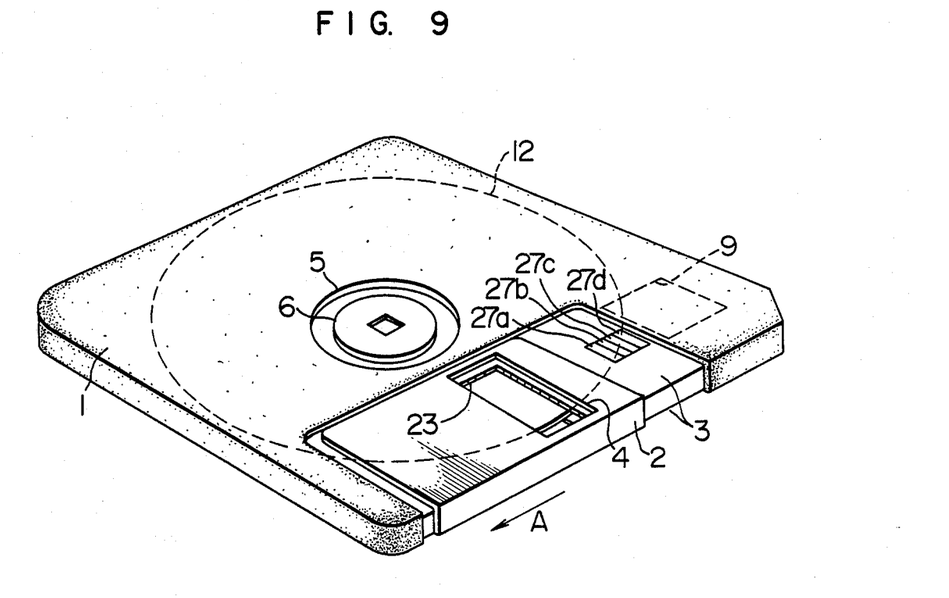
FIGS. 9 and 10 are perspective views of a composite memory device in which a slidable shutter is opened and closed, respectively, showing a third embodiment of the present invention.
Figure 10:
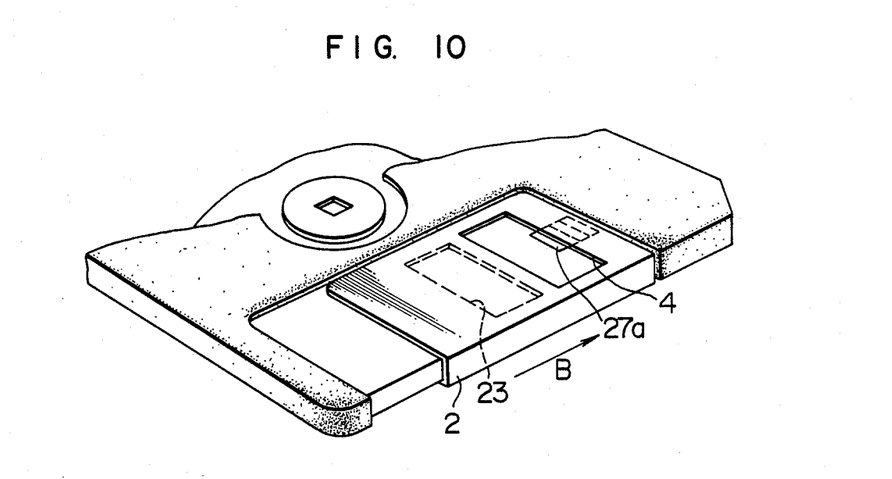

FIG. 9 is a perspective view of the third embodiment of the composite memory device according to the present invention which comprises what is called a 3.5-inch micro-floppy disc cartridge which employs as a disc-shaped recording medium 12 a magnetic disc. The disc-type recording medium 12 is housed within a housing 1. A central portion of the housing 1 is provided with an aperture 5 through which a hub 6 fixed to the center of the recording medium 12 is exposed, the disc-type recording medium 6 being rotated through the hub 6 when the disc cartridge is loaded into the disc drive.

Each side of one edge of the housing 1 is provided with a recess 3 and a head entry aperture 23. A shutter 2 is mounted in such a manner as to be slidable along the surfaces of the housing within the recesses 3 so as to expose and screen the head entry aperture 23. A portion of the shutter 2 is provided with a head entry aperture hole 4 which is substantially aligned with the head entry aperture 23 when the shutter opens the head entry aperture. A semiconductor memory or semiconductor memory/processor (hereinafter referred to as a semiconductor memory) is mounted in a portion of the housing 1, and a plurality of pins 27a, 27b, 27i c, 27d . . . which connects the semiconductor memory 9 to an external circuit are provided on a portion of the recess 3. FIG. 9 shows a composite memory device in the state wherein the shutter 2 is moved in the direction indicated by an arrow A and the head entry aperture hole 4 is substantially aligned with the head entry aperture 23 as the composite memory device is loaded into the disc drive. FIG. 10 shows the composite memory device in the state wherein the shutter 2 is moved in the direction indicated by an arrow B so as to screen the head entry aperture 23. The pins 27a, 27b . . . are positioned at a location at which they are completely exposed from the housing 1 in the state shown in FIG. 9 and at which they are completely screened by the shutter 2 in the state shown in FIG. 10. In consequence, the pins are electrically connected to the signal connector (not shown) provided on the disc drive without any problem in the state shown in FIG. 9 so as to transfer signals between the disc drive and the semiconductor memory, to be grounded and apply power source voltage. In the state shown in FIG. 10 wherein the composite memory device is removed from the disc drive, the pins may contact with human body. However, most of the pins are screened by the shutter 2 and are thereby protected from the damage caused by the static electricity. If the shutter 2 is made of a conductor such as a metal, it is preferable for the shutter 2 to be grounded while the composite memory device is loaded into the disc drive. All of the pins 27 for the semiconductor memory may not be able to be located in the area at which they can be screened by the shutter 2. In such a case, a pin which withstands impact caused by the static electricity, such as a ground pin, may be disposed at a location at which it is exposed, as shoWn in FIG. 10. Of course, this is a most extreme measure. The size or arrangement of the pins should be studied so that the pins are all screened by the shutter so as to prevent soiling of the pins by the contact with the human body and to make the handling of the composite memory device more convenient. The semiconductor memory 9 may be located at a location other than that shown in FIGS. 9 and 10, so long as it can be electrically connected to the pins 27 and at a location which it does not make contact with the disc-shaped recording medium. The number and shape of the pins 27 are not limited to those shown in the figures. In short, they may be provided at a position at which they are exposed when the composite memory device is loaded into the disc drive and at which a required number of them are screened by the shutter when the device is removed from the disc drive.

Figure 11:
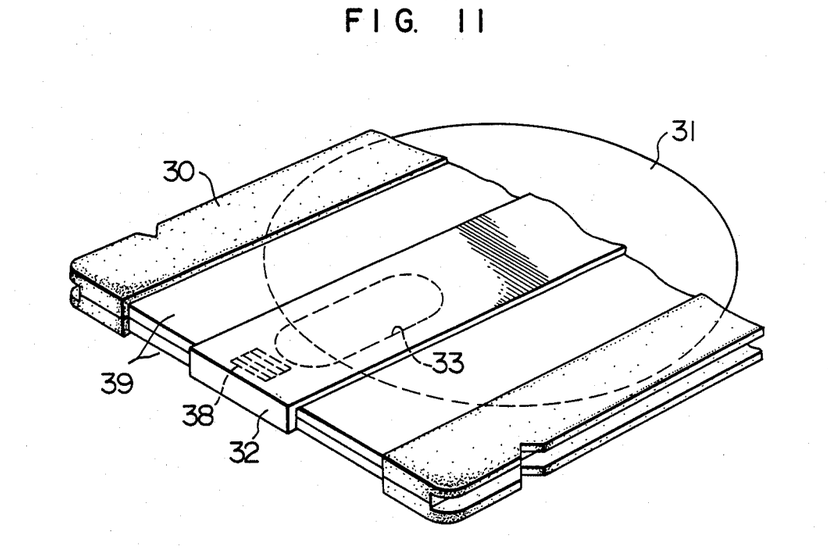
FIGS. 11 and 12 are perspective views of a composite memory device, showing a fourth embodiment of the present invention.

FIG. 11 is a perspective view of a fourth embodiment of a composite memory device according to the present invention, in which the present invention is applied to an optical disc cartridge which employs as a disc-shaped recording medium 31 an optical disc. The optical disc cartridge is essentially constructed by a housing 30 made of a synthetic resin, the disc type recording medium 31 rotatably housed within the housing (a cartridge casing), and a shutter formed by bending a metal thin plate in an inverted shape. The housing 30 consists of an upper and lower thin casings which are joined together to form a central space used to house the disc type recording medium 31 and other components. The surface of the housing 30 is provided with a head entry aperture 33 through which an optical head accesses the disc-type recording medium 31. The head entry aperture 33 is normally screened by the shutter 32 so as to protect the recording medium. The shutter 32 is formed by bending a metal thin plate such as a stainless thin plate, into an inverted shape. It is slidable along the surfaces of the housing so as to be moved to a position at which it exposes the head entry aperture 33 when the composite memory device is loaded into the disc drive. The disc-type recording medium 31 comprises an optical disc on the two sides of which optical data are recorded. Normally, the recording medium 31 is stationarily housed within the housing, and becomes rotatable by a mechanism (not shown) when the composite memory device is loaded into the disc drive and the shutter opens the head entry aperture.

The optical disc which has been schematically described in the above has been disclosed in the specification of Japanese Patent Laid-Open No. 150963/1983 by the present applicant, and detailed description thereof is therefore omitted.

Figure 12:
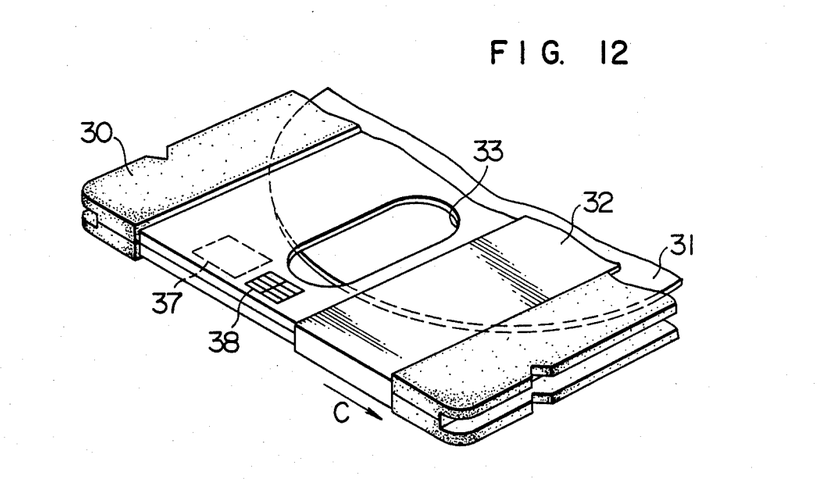

The optical disc cartridge of this invention incorporates a rewritable non-volitale semiconductor memory which stores the directory data used to access the data stored in the optical disc, and the pins for the semiconductor memory are located on the wall of the housing at a location at which they are screened by the shutter 32 when the shutter screens the head entry aperture 33. FIG. 11 shows the composite memory device in the state wherein it is removed from the disc drive and in which the shutter 32 is located at the center of recesses 39 of the housing 30 so as to screen the head entry aperture 33. Pins 38 are disposed on the wall of the housing which is screened by the shutter 32 in that state. FIG. 12 is a perspective view of an essential part of the composite memory device of FIG. 11 which is loaded into the disc drive. The shutter 32 slides in the direction indicated by an arrow C so as to open the head entry aperture 33. In this state, the pins 38 are all exposed and are electrically connected to the signal connector (not shown) provided on the disc drive so as to process signals. The semiconductor memory 37 is provided at a location at which it can be electrically connected to the pins and at which it does not contact with the disc type recording medium when it is rotated. FIG. 12 shows one example of the location of the semiconductor memory. If the disc-type recording medium 31 is of a type on which data can be recorded on two sides, the semiconductor memory 37 and the pins are provided on the front and back of the housing, respectively, one for each surface, so as to store the directory data for the corresponding surface alone.

The shape, the number, and the location of the pins 38 are not limited to those shown in FIG. 12, but various modifications are possible.

Although the present invention will be detailed in specific forms, it should be noted that the technical scope of the present invention is not limited to the above-described embodiments but the various modifications or improvements can be made thereto within the scope which is defined by the appended claims.

What is claimed is:

1. A composite memory device including a disc type recording medium having a large number of recording tracks to and from which data is written or read, and a housing for holding said disc type recording medium, characterized in that a rewritable semiconductor memory is provided in a portion of said housing at which said semiconductor memory does not interfere with said disc type recording medium, and pins are provided in a portion of the outer periphery of said housing so as to transfer signals between said semiconductor memory and an external device.

2. A composite memory device according to claim 1, wherein said disc type recording medium comprises a magnetic disc.

3. A composite memory device according to claim 1, wherein said disc type recording medium comprises an optical disc.

4. A composite memory device comprising:
a disc type recording medium having a large number of recording tracks to and from which data is written and/or read;
a housing for holding said disc type recording medium in such a manner as to be rotatable on a plane;
a head entry aperture opened in a portion of the wall of said housing through which a head for transferring signals to and from said disc type recording medium is inserted;
a shutter slidably mounted on the wall of said housing in such a manner that it opens or closes said head entry aperture by sliding along the surface of the wall of said housing;
a rewritable semiconductor memory mounted in a portion of said housing; and
pins of said semiconductor memory for transferring signals to and from an external device, at least a portion of said pins being positioned at a location at which it is screened by said shutter when said shutter is located at a position at which it covers said head entry aperture and is exposed when said shutter is located at a position at which it opens said head entry aperture.

* * * * *